United States Patent
Kato et al.

(10) Patent No.: US 8,069,574 B2
(45) Date of Patent: Dec. 6, 2011

(54) ROTARY CUTTER FOR MOWER

(75) Inventors: Hiroki Kato, Tokyo (JP); Tetsuya Yamada, Tokyo (JP)

(73) Assignee: Starting Industrial Co., Ltd., Tokyo (JP)

( * ) Notice: Subject to any disclaimer, the term of this patent is extended or adjusted under 35 U.S.C. 154(b) by 163 days.

(21) Appl. No.: 12/382,315

(22) Filed: Mar. 13, 2009

(65) Prior Publication Data

US 2010/0229401 A1  Sep. 16, 2010

(51) Int. Cl.
*A01D 34/416* (2006.01)

(52) U.S. Cl. ............................................. 30/276; 30/347

(58) Field of Classification Search ................... 30/276, 30/347; 56/12.7, 295
See application file for complete search history.

(56) References Cited

U.S. PATENT DOCUMENTS

| | | | |
|---|---|---|---|
| 4,411,069 A * | 10/1983 | Close et al. ..................... 30/276 |
| 5,896,666 A | 4/1999 | Iacona et al. | |
| 6,347,455 B2 * | 2/2002 | Brant et al. ..................... 30/276 |
| 6,519,857 B1 * | 2/2003 | Proulx et al. ..................... 30/276 |
| 6,581,292 B2 * | 6/2003 | Allis ................................ 30/276 |
| 7,257,898 B2 * | 8/2007 | Iacona ............................. 30/276 |
| 7,587,828 B2 * | 9/2009 | Legrand .......................... 30/276 |
| 2004/0237315 A1 * | 12/2004 | Alliss ............................. 30/276 |
| 2008/0263874 A1 * | 10/2008 | Kato ............................... 30/276 |

FOREIGN PATENT DOCUMENTS

JP  2008-253216  * 10/2008

* cited by examiner

*Primary Examiner* — Hwei C Payer
(74) *Attorney, Agent, or Firm* — Breiner & Breiner, L.L.C.

(57) ABSTRACT

A rotary cutter for a mower is described including at least one cord of a predetermined length extending from the cutting head driven for rotation, and at least one fastening element for fixing one end of the cord to the cutting head main body. The fastening element includes a pair of ratchets. Each ratchet pivots for turning on the main body and is constantly applied with a rotational force in a predetermined direction by a spring. The cord is clamped and fastened by the ratchets. An inner end portion of the cord inserted from the sidewall of the main body is fastened by the fastening element, and the cord is removed and replaced with a new cord when the cord is worn out. The fastening element including a pair of ratchets with each ratchet of the pair including at least two or more sheets of laminated ratchets.

2 Claims, 6 Drawing Sheets

PRIOR ART

PRIOR ART

ROTARY CUTTER FOR MOWER

TECHNICAL FIELD

The present invention relates to a rotary cutter for a mower used for mowing grass, lawn, and the like with a cord of a predetermined length extending in a radial direction of a cutting head driven for rotation by a motor or the like through a drive shaft and, more particularly, to a rotary cutter for a mower, in which the cord can be removed and easily replaced with a new cord when the cord is worn out.

BACKGROUND ART

As this type of rotary cutter, there is conventionally proposed one including a cutting head formed of a disk-shaped base plate having at its center a drive shaft coupling portion and provided at its outer periphery with a sidewall and a substantially cylindrical protecting cover detachably mounted to the sidewall to face the base plate. Inside the cutting head, fastening means for fastening a cord of a predetermined length and for mowing grass, lawn, and the like by rotation is provided to the disk-shaped base plate. The fastening means presses and fixes the cord onto a pressing wall provided to the sidewall of the base plate by an elastic member such as a coil spring and a torsion spring and a fastening member in a shape of a cam, a cylindrical rod, or the like (see U.S. Pat. No. 5,896,666).

There is also a known rotary cutter, as shown in FIGS. 4 and 5, including a disk-shaped cutting head main body 10 formed of a case 10-1 having a drive shaft coupling shaft tube portion 10-1a at its central portion and a cover 10-2 having a through hole 10-2a for the drive shaft coupling shaft tube portion 10-1a at its central portion and paring up with the case 10-1. At an outer peripheral end portion of the cutting head main body 10, fastening means 11 for fastening cords 12 of predetermined length are provided. When the cord 12 of the predetermined length inserted into the cutting head main body 10 is worn out, the cord is removed from the cutting head main body 10 and replaced with a new cord. Each of the cord fastening means 11 of the rotary cutter is disposed in a cord guide 11-1 provided in an opening formed in a sidewall of the cutting head main body 10 and is formed of a pair of ratchets 11-2, each of the ratchets being constantly applied with a rotational force in a certain direction by a spring 11-3 pivoted for turning on and mounted from outside to a support shaft 10-3 protruding from the cover 10-2 of the cutting head main body 10 to fasten the cover 10-2 and the case 10-1 together by using a fastening screw 15. In other words, in the cord fastening means 11, one end of the cord 12 of the predetermined length inserted into the cutting head main body 10 from a cord lead-out outlet (cord guide) 11-1 is clamped and fastened by the pair of ratchets 11-2. Therefore, in the case of this rotary cutter, a space 10-4 for holding the code 12 to remove and replace it is provided between the ratchets 11-2 and the drive shaft coupling shaft tube portion 10-1a at the central portion of the cutting head main body. A drive shaft 13 of the cutting head main body 1 is mounted by a coupling bolt 16 through a lid body 14 covering a bottom portion of the cutting head main body 11 as shown in FIG. 4.

DISCLOSURE OF INVENTION

However, in the case of the fastening means used for the rotary cutter described U.S. Pat. No. 5,896,666, that is, in the case of the fastening means pressing and fixing the cord onto a pressing wall provided to the sidewall of the base plate by an elastic member such as a coil spring and a torsion spring and a fastening member in a shape of a cam, a cylindrical rod, or the like, there are drawbacks that gripping force of a cord is weak because there are a little cord gripping portions of ratchets gripped by a fastening member, and that a cord falls out easily when centrifugal force generates and drawing tension acts on the cord. In the case of a fastening means used for the rotary cutter shown in FIGS. 4 and 5, in which a cord is clamped and fastened by the pair of ratchets 11-2, there are drawbacks not only that gripping force of a cord is weak, but also that the cord is cut off from a gripping portion of the ratchets since the serrated portions of the ratchets bite into the cord. Furthermore, a fastening means of the prior art has a drawback that the means cannot be compatible with a cord having a different cross-section and a bent cord.

The present invention has been made to overcome the drawbacks of the fastening means for the above-described conventional rotary cutter, in particular, the drawback of a fastening method by a ratchet. Further, the present invention is directed to produce a rotary cutter for mower having a cord fastening means wherein a gripping force of a cord is strong; the cord is difficult to cut off from a gripping portion of a ratchet; and the means can be compatible with a cord having a different cross-section or a bent cord.

A rotary cutter for a mower according to the present invention is a rotary cutter for a mower, comprising: a cutting head including a main body, the main body having a case, a cover and a sidewall; at least one cord of a predetermined length extending in a radial direction of the cutting head from the cutting head driven for rotation through a drive shaft; at least one fastening means for fixing one end of the cord to the cutting head main body, wherein the fastening means including a pair of ratchets, each ratchet pivoted for turning on the main body and constantly applied with a rotational force in a predetermined direction by a spring; and the cord is clamped and fastened by the ratchets, an inner end portion of the cord inserted from the sidewall of the main body being fastened by the fastening means, and the cord being removed and replaced with a new cord when the cord is worn out; wherein the fastening means includes a pair of ratchets, and each of the ratchets is further comprised of at least two or more sheets of laminated ratchets. Each sheet of the laminated ratchets is stacked and pivoted so as to turn separately so that each sheet independently clamps and fastens the cord. In addition, the laminated ratchet is formed from a plate-like member that is thinner than a width of the cord.

EFFECT OF INVENTION

The rotary cutter for the mower according to the invention is the rotary cutter for the mower for mowing grass, lawn, or the like with at least one cord of the predetermined length extending in the radial direction of the cutting head from the cutting head driven for rotation through the drive shaft. The rotary cutter includes at least one fastening means for fixing one end of the cord to the cutting head main body having the case and the cover. The inner end portion of the cord inserted from the sidewall of the head main body is fastened by the fastening means. The cord is removed and replaced with the new cord when the cord is worn out. The cord is clamped by at least two or more laminated ratchets because the fastening means is comprised of at least two or more laminated ratchets, that is, at least two or more sets of ratchets. Accordingly, gripping force of the cord is strengthened and the cord is hardly fallen out easily even if centrifugal force generates and drawing tension acts on the cord. Moreover, at the same time, the gripping force for the cord does not concentrate in one place but disperse, therefore, the possibility of breaking the cord by biting into the cord by the serrated portions of the ratchets is significantly decreased, which is an advantageous effect. Furthermore, the fastening means of the present invention has an advantageous effect that the means can be compatible with a code having a different cross-section and a bent cord.

BEST MODE FOR CARRYING OUT THE INVENTION

BRIEF DESCRIPTION OF DRAWINGS

FIG. 3(a) is a schematic cross-sectional view showing a pair of ratchets for fastening a cord, the ratchet comprising two sheets of laminated ratchets being coaxially stacked, and showing a cord having a circular cross-sectional shape;

FIG. 3(b) is a schematic cross-sectional view showing a pair of ratchets for fastening a cord, the ratchet comprising three sheets of laminated ratchets being coaxially stacked, and showing a cord having a circular cross-sectional shape;

FIG. 3(c) is a schematic cross-sectional view showing a pair of ratchets for fastening a cord, the ratchet comprising two sheets of laminated ratchets being coaxially stacked, and showing a cord having a rhombic [diamond] cross-sectional shape;

FIG. 3(d) is a schematic cross-sectional view showing a pair of ratchets for fastening a cord, the ratchet comprising two sheets of laminated ratchets being coaxially stacked, and showing a cord having a polygonal cross-sectional shape;

FIG. 3(e) is a schematic cross-sectional view showing a pair of ratchets for fastening a cord, the ratchet comprising three sheets of laminated ratchets being coaxially stacked, and showing a cord having a polygonal cross-sectional shape;

Figure 1:
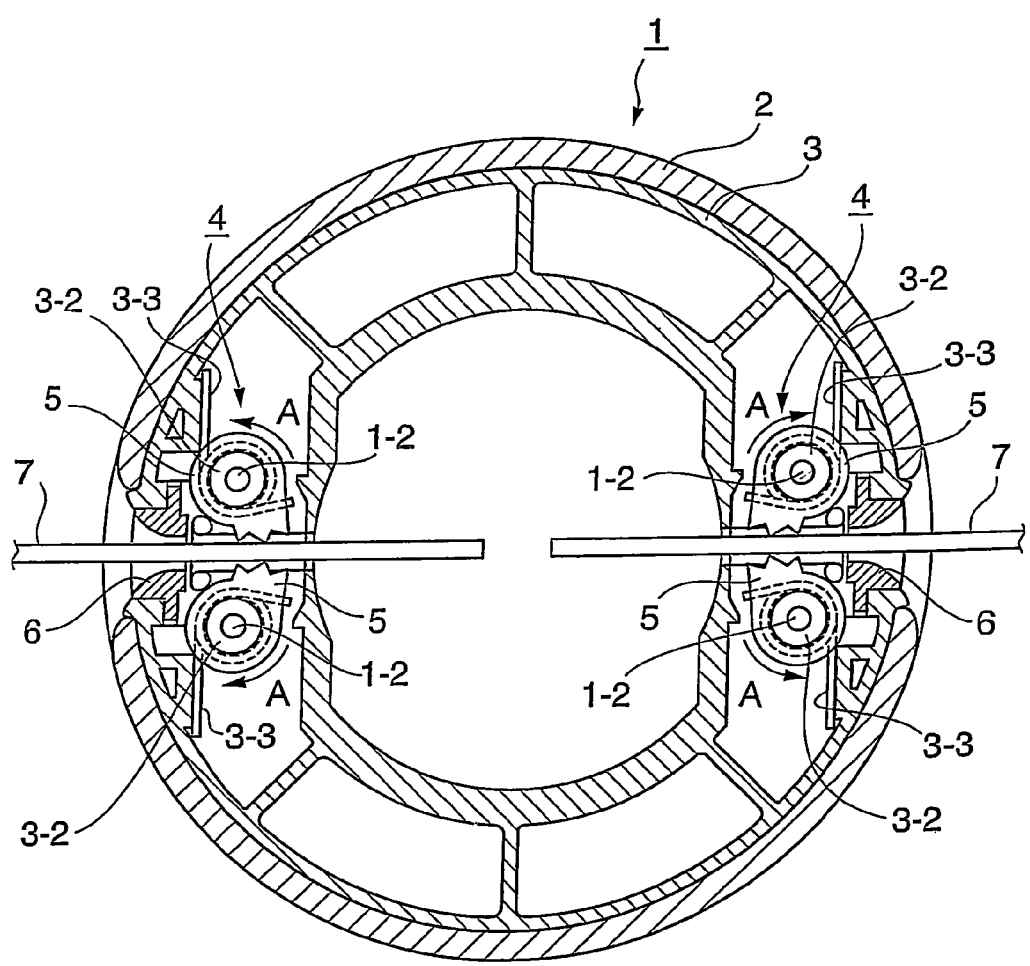
FIG. 1 is a cross-sectional plan view showing an embodiment of a rotary cutter for a mower according to the present invention.

A reference numeral 1 designates a cutting head main body, 2 designates a case, 3 designates a cover, 4 designates a cord fastening means, 5 designate ratchets, 5-1 and 5-2 designate laminated ratchets, 6 designate a cord guide, 7, 7a and 7b designate cords, respectively.

Figure 2:
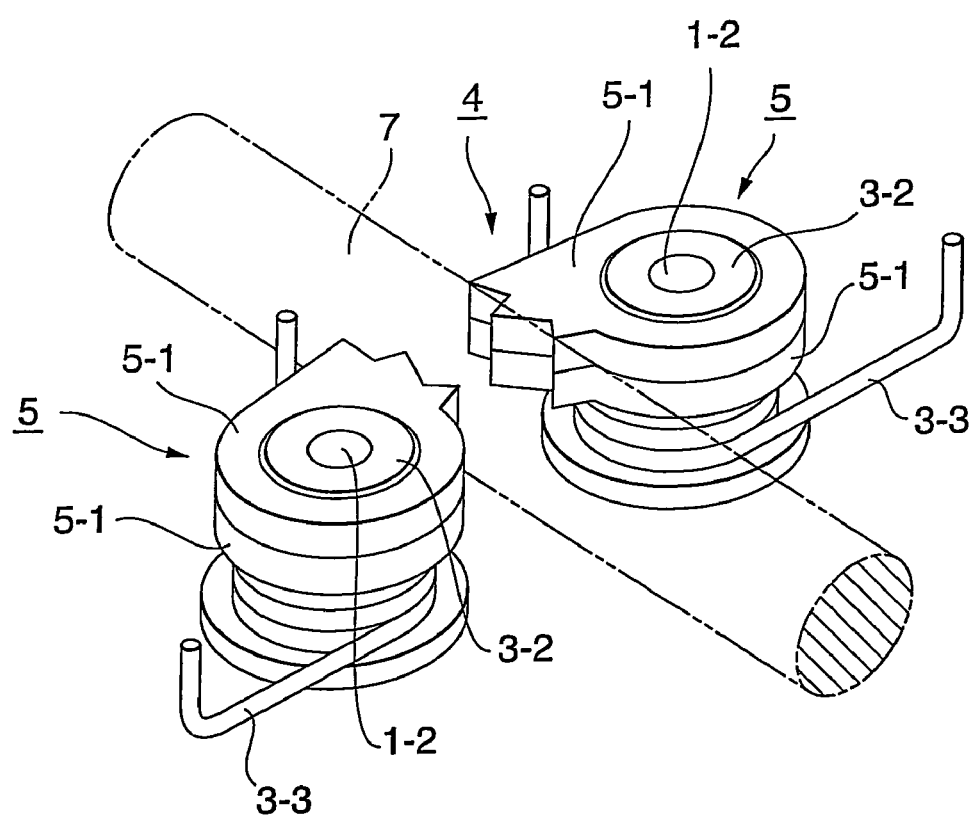
FIG. 2 is an enlarged perspective view showing a ratchet for cord fastening for the rotary cutter for a mower shown in FIG. 1.
Figure 4:
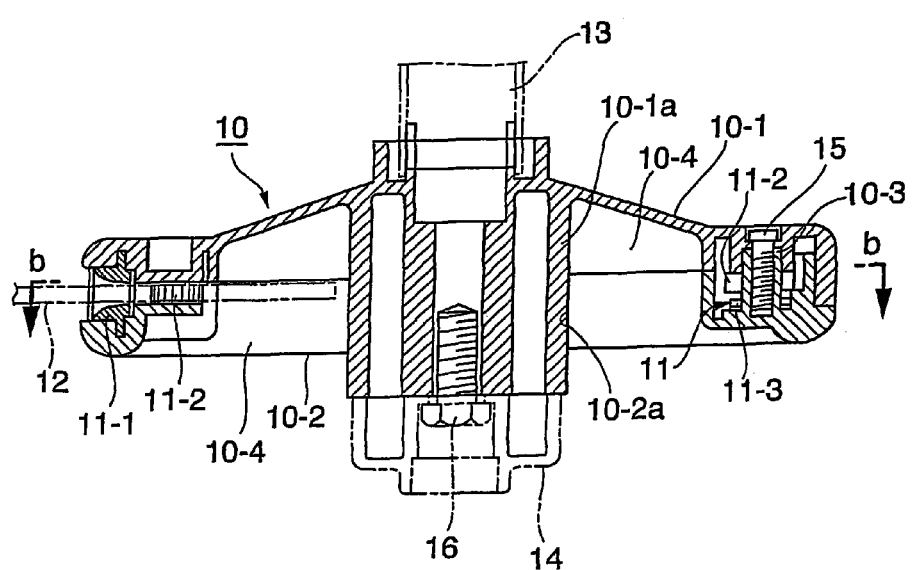
FIG. 4 is a vertical sectional front view showing an embodiment of a prior-art rotary cutter for a mower targeted by the invention.
Figure 5:
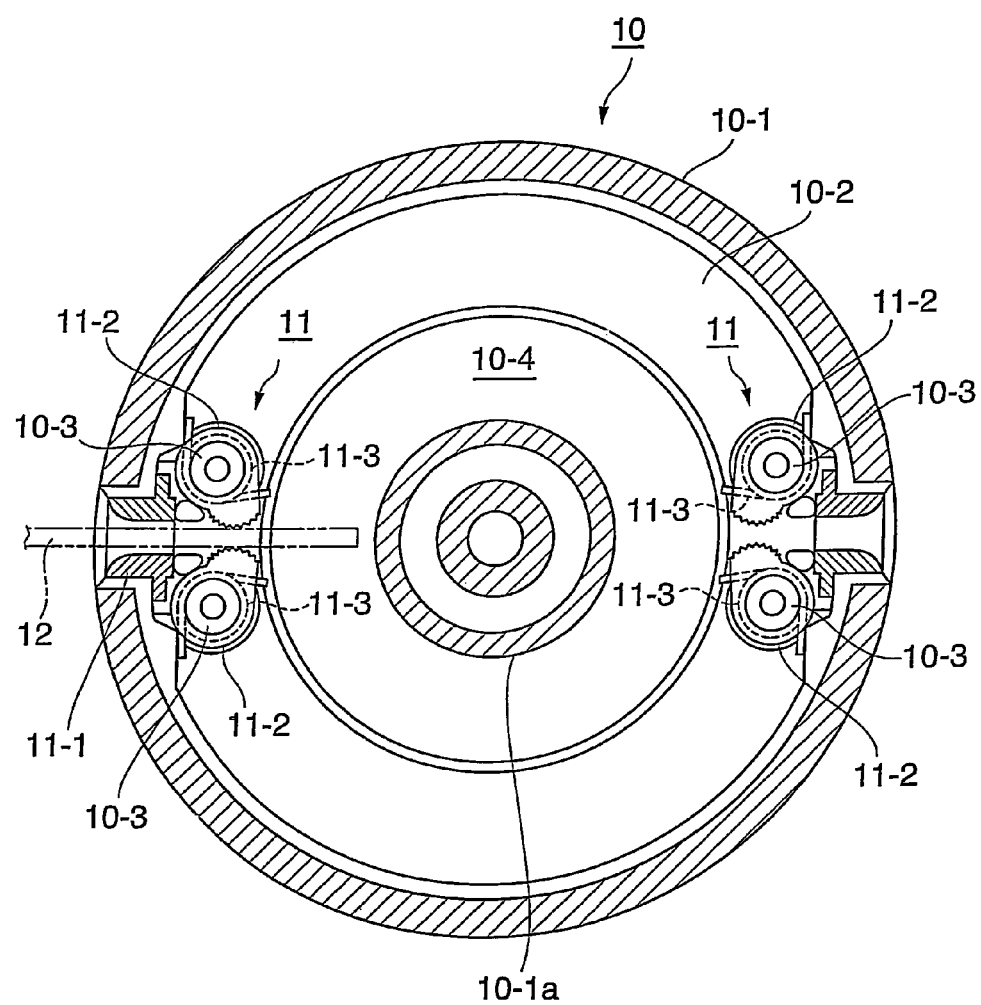
FIG. 5 is a cross-sectional plan view along a line b-b in FIG. 4.

DESCRIPTION OF REFERENCE NUMERALS 1 cutting head main body
2 case
3 cover
3-2 support shaft
3-3 spring
4 cord fastening means
5 ratchet
5-1, 5-2 laminated ratchet
6 cord guide
7, 7a, 7b cord The rotary cutter for the mower shown in FIG. 1 includes the circular cutting head main body 1 formed of the case 2, which is same as the one shown in FIGS. 4 and 5, and the cover 3 pairing up with the case 2. At an outer peripheral end portion of the main body 1, the fastening means 4 (two fastening means, here) for fastening the cords 7 of predetermined length are provided. Each of the cord fastening means 4 is disposed inside the cord guide 6 provided in an opening portion formed in a sidewall of the main body 1 to be sandwiched [gripped] between the case 2 and the cover 3 and is formed of a pair of ratchets 5, each of the ratchets 5 being constantly applied with a rotational force in a certain direction by a spring 3-3 pivoted for turning on and mounted from outside to a support shaft 3-2 protruding from the cover 3 of the main body 1, and the pair of ratchets 5 being comprised of two sheets of laminated ratchets 5-1 stacked to match the shape, as shown in, for example, the enlarged FIG. 2. In other words, in the cord fastening means 4, one end of the cord 7 of the predetermined length inserted into the cutting head main body 1 from the cord guide 6 is clamped and fastened by the pair of ratchets 5, each of the ratchets 5 being comprised of two sheets of laminated ratchets 5-1 and being applied with the rotational force in the certain direction by the spring 3-3. The case 2 and the cover 3 are integrally coupled by fastening screws 1-2 passing through the case 2 and screwed into the four support shafts 3-2 to which the respective ratchets 5 of the pairs are mounted.

Moreover, in the invention, examples of combinations of the ratchets for fastening a cord and a cord having a different cross-sectional shape are shown in FIGS. 3, and it is possible to vary the number of the separately turnable laminated ratchets to be used in order to conform to the shape of the cord cross-section.

Figure 3A:
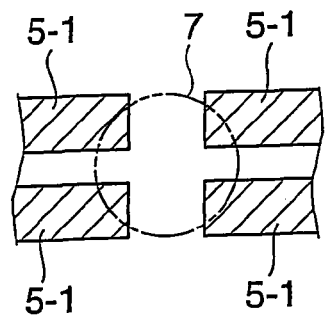
FIG. 3(a)-3(e) are examples of embodiments of ratchets for cord fastening for the same rotary cutter as above, and a cord having a different cross-sectional shape.
Figure 3B:
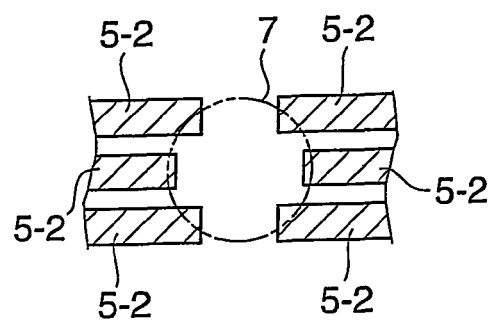
Figure 3C:
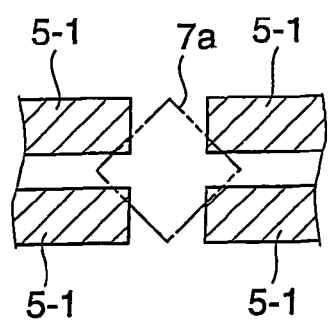
Figure 3D:
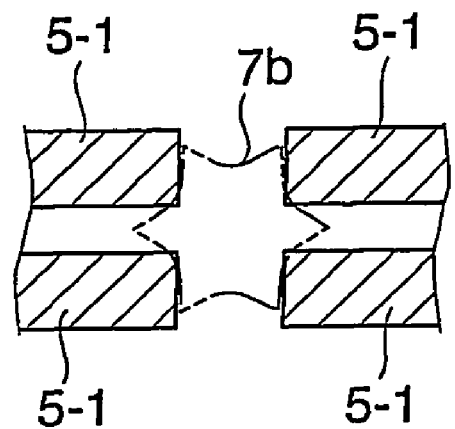
Figure 3E:
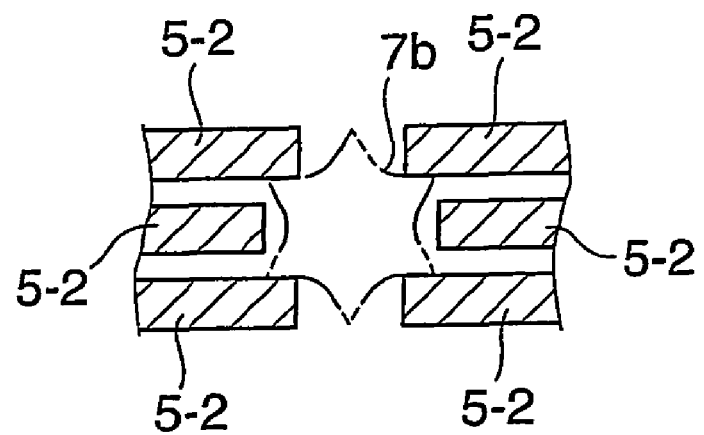

In other words, FIG. 3(a) shows a pair of ratchets for fastening a cord, the ratchets being comprised of two sheets of laminated ratchets 5-1 for fastening a cord 7 having a circular cross section. In the case of this combination, there are two cord-clamping parts since the circular cord 7 is clamped by two sets of ratchets. FIG. 3(b) shows a pair of ratchets for fastening a cord, the ratchets being comprised of three sheets of laminated ratchets 5-2 for fastening a cord 7 having a circular cross section. In the case of this combination, there are three cord-clamping parts since the circular cord 7 is clamped by three sets of ratchets. FIG. 3(c) shows a pair of ratchets for fastening a cord, the ratchets being comprised of two sheets of laminated ratchets 5-1 for fastening a cord 7a having a rhombic [diamond] cross section. In the case of this combination, there are two cord-clamping parts since the rhombic [diamond] cord 7a is clamped by two sets of ratchets. FIG. 3(d) shows a pair of ratchets for fastening a cord, the ratchets being comprised of two sheets of laminated ratchets 5-2 for fastening a cord 7b having a rhombic [diamond] cross section. In the case of this combination, there are two cord-clamping parts since the rhombic [diamond] cord 7b is clamped by two sets of ratchets. FIG. 3(e) shows a pair of ratchets for fastening a cord, the ratchets being comprised of three sheets of laminated ratchets 5-2 for fastening a cord 7b having a polygonal cross section. In the case of this combination, there are three cord-clamping parts since the polygonal cord 7b is clamped by three sets of ratchets.

In addition, the number of sheets of laminated ratchets 5-1 and 5-2 as used, and each gap between each of the laminated ratchets 5-1 and 5-2 are set properly, depending on a cross-sectional shape, width and diameter of said cord. Besides, a spacer (not shown) is used for the gap between each of laminated ratchets if necessary.

In the rotary cutter for a mower having the above structure, one end portion of each of the cords 7 of predetermined length is inserted from the cord guide 6 provided in the opening formed in the sidewall portion of the cutting head main body 1 and is guided inside and then passes between the pair of ratchets 5 to be inserted into inside. When the cord 7 passes between the pair of ratchets 5, in the case of the ratchets 5 shown in FIGS. 1 and 2, the cord 7 rotates the ratchets 5 in directions of arrows A against biasing forces of the springs 3-3 and the cord 8 that has stopped in a predetermined position is fastened and fixed between the pair of ratchets 5 by the biasing forces of the springs 3-3. In contrast, in the case of the pair of ratchets for fastening a cord, the ratchets comprising several sheets of laminated ratchets 5-1 claimed in the present invention, as shown in FIG. 3, gripping force of a cord is increased because the cord 7 is clamped by at least two or more sets of ratchets, accordingly, the cord is hardly fallen out easily even if centrifugal force generates and drawing tension acts on the cord. Moreover, at the same time, the gripping force for the cord does not concentrate in one place but disperse, therefore, the possibility of breaking the cord by biting into the cord by the serrated portions of the ratchets is significantly decreased. Furthermore, the fastening means of the present invention can easily and precisely clamp cords 7, 7a and 7b, which have different cross-sectional shapes, by using several sheets of the laminated ratchets 5-1 or 5-2.

INDUSTRIAL APPLICABILITY

In the rotary cutter for a mower according to the present invention, the rotary cutter is comprised of at least one fastening means for fixing one end of the cord to the cutting head main body, the cutting head main body having the case and the cover. The inner end portion of the cord inserted from the sidewall of the main body is fastened by the fastening means. The cord is removed and replaced with a new cord when the cord is worn out. The cord is clamped by at least two or more laminated ratchets because the fastening means is comprised of at least two or more laminated ratchets, that is, at least two or more sets of ratchets. Accordingly, gripping force of the cord is strengthened and the cord is hardly fallen out easily even if centrifugal force generates and drawing tension acts on the cord. Moreover, at the same time, the gripping force for the cord does not concentrate in a one place but disperse, therefore, the possibility of breaking the cord by biting into the cord by the serrated portions of the ratchets is significantly decreased, which is an advantageous effect. Furthermore, the fastening means of the present invention has an advantageous effect that the means can be compatible with a code having a different cross-section and a bent cord. Hence, the rotary cutter claimed in the present invention is extremely practical.

The invention claimed is:

1. A rotary cutter for a mower, comprising
a cutting head including a main body, the main body having a case, a cover and a sidewall,
at least one cord of a predetermined length extending in a radial direction of the cutting head from the cutting head driven for rotation through a drive shaft,
at least one fastening means for fixing one end of the cord to the main body, wherein the fastening means includes a pair of ratchets, each ratchet pivoted for turning on the main body and constantly applied with a rotational force in a predetermined direction by a spring, and the cord is clamped and fastened by the ratchets, an inner end portion of the cord inserted from the sidewall of the main body being fastened by the fastening means, and the cord being removed and replaced with a new cord when the cord is worn out,
wherein each of said ratchets comprises at least two or more sheets of laminated ratchets,
each sheet of said laminated ratchets is coaxially stacked and pivoted so as to turn separately so that said each sheet independently clamps and fastens the cord.

2. The rotary cutter for a mower according to claim 1, wherein each of the laminated ratchets is formed from a plate-like member that is thinner than a width of the cord.

* * * * *